United States Patent [19]

Morishita et al.

[11] Patent Number: 4,939,436

[45] Date of Patent: Jul. 3, 1990

[54] MOTOR DRIVEN TYPE POWER STEERING CONTROL DEVICE

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 196,207

[22] PCT Filed: Jul. 11, 1987

[86] PCT No.: PCT/JP87/00497

§ 371 Date: Mar. 11, 1989

§ 102(e) Date: Mar. 11, 1989

[87] PCT Pub. No.: WO88/00546

PCT Pub. Date: Jan. 28, 1988

[30] Foreign Application Priority Data

Jul. 11, 1986 [JP] Japan ................... 61-164159

[51] Int. Cl.⁵ ............................................. H02K 17/32
[52] U.S. Cl. ..................................... 318/434; 180/79.1; 180/142; 318/446; 318/467; 318/489
[58] Field of Search ............... 318/434, 491, 400–403, 318/138–139, 568, 432, 487–489, 466–470, 446–447; 180/79.1, 141–142, 147–148

[56] References Cited

U.S. PATENT DOCUMENTS

| 4,532,567 | 7/1985 | Kade | 361/31 |
| 4,580,649 | 9/1984 | Ohe et al. | 180/79.1 |
| 4,582,155 | 4/1986 | Ohe | 180/79.1 |
| 4,591,014 | 4/1984 | Yasuda | 180/79.1 |
| 4,639,651 | 1/1987 | Shimizu | 318/432 |
| 4,687,976 | 8/1987 | Shimizu | 318/432 |
| 4,789,040 | 6/1987 | Morishita et al. | 180/142 |

OTHER PUBLICATIONS

Patent Abstract of Japan, vol. 9, No. 223, 58-189819, Shiraishi.

Primary Examiner—William M. Shoop, Jr.
Assistant Examiner—David Martin
Attorney, Agent, or Firm—Sughrue, Mion, Zinn, Macpeak & Seas

[57] ABSTRACT

In order to perform a vehicle speed control in a motor driven type power steering control device, a speed change point detection sensor is provided and an assist is added or removed according to a speed change point signal therefrom. Therefore, a construction of an input circuit and a control program become simple and a simple control unit can be used. Further, by inputting a speed change point other than those at which the assist is added, it is possible to easily determine a breakage of an input line for speed change point, resulting in a highly safe power steering.

2 Claims, 4 Drawing Sheets

MOTOR DRIVEN TYPE POWER STEERING CONTROL DEVICE

FIELD OF TECHNOLOGY

This invention relates to a motor driven type power steering control device for assisting an operation of a steering device of an automobile with a rotational force of a motor.

BACKGROUND ART

A conventional power steering device of this type is adapted to transmit drive force of a motor through a reduction mechanism and a transmission mechanism such as gear or belt to a steering shaft or a rack shaft.

The conventional power steering device as mentioned above is of the type in which a vehicle speed is detected by a vehicle speed sensor so that the assist is removed when the detected speed reaches or exceeds a constant value. However, since the speed signal from the speed sensor is supplied as a series of pulses the number of which is proportional to the vehicle speed, a construction of an input circuit and a program for calculating the vehicle speed become complicated, resulting in high costs of a microcomputer and a vehicle speed input circuit to be used in a control unit.

This invention was made in view of such problems as mentioned above and an object thereof is to obtain a motor driven power steering control device which can use an inexpensive microcomputer by simplifying constructions of the input circuit and the control program.

DISCLOSURE OF THE INVENTION

The motor driven power steering control device of this invention comprises a speed change point sensor for sensing a speed change point, a torque sensor for sensing a rotational force of a steering wheel, a control unit to be supplied with signals from these sensors as input signals, a motor driven by a battery through the control unit and an electromagnetic clutch engaged with and disengaged from an output shaft of the motor by means of the control unit.

The motor driven power steering control device of this invention can use an inexpensive microcomputer by simplifying an input circuit and a control program by means of a usage of not a vehicle speed sensor but a speed change point sensor for sensing a speed change point and facilitates a decision of breakage of an input line for a speed change point signal by inputting the speed change point outside a range in which a power assist is to be added, resulting in a highly safe power steering.

PREFERRED EMBODIMENT FOR PRACTICING THE INVENTION

Figure 1:
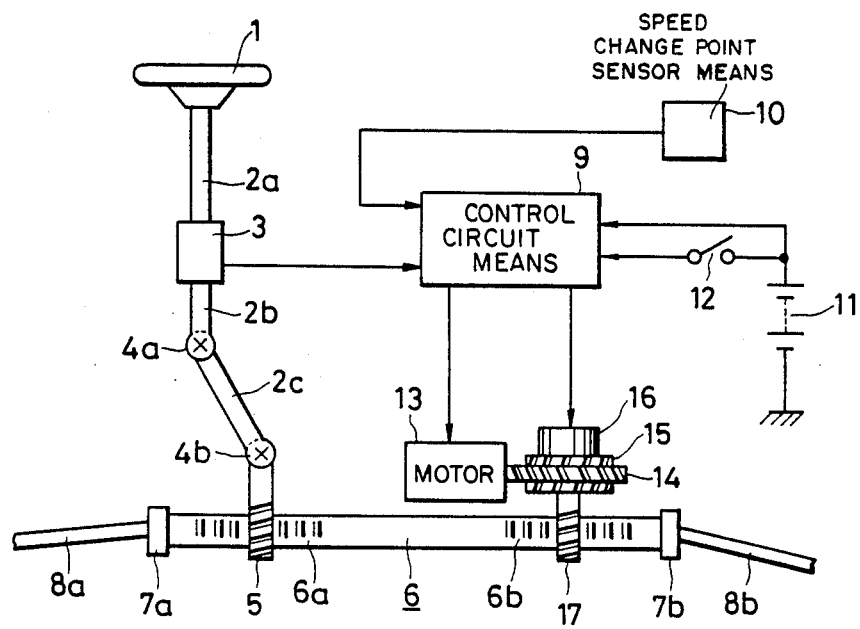
FIG. 1 shows a construction of a motor driven power steering control device to an embodiment of this invention.

An embodiment of this invention will be described with reference to the drawings. FIG. 1 shows a construction of a motor driven power steering control device with electric portions thereof in block circuit diagram, in which 1 is a steering wheel to be operated by a rotational force given by a driver, 3 a torque sensor for providing an output signal corresponding to the rotational force applied to the steering wheel 1, 4a a first universal joint, 4b a second universal joint, 2a a first steering shaft connecting the steering wheel 1 and the torque sensor 3, 2b a second steering shaft connecting the torque sensor 3 and the first universal joint 4a, 2c a third steering shaft connecting the first universal joint 4a and the second universal joint 4b, 5 a first pinion shaft connected to the second universal joint, 6 a rack shaft having a first rack teeth portion 6a meshed with the pinion shaft 5 and a second rack teeth portion 6b and 7a a ball joint connecting a tie rod 8a and an end of the first rack teeth portion 6a, 7b the other ball joint connecting the other tie rod 8b and the second rack teeth portion 6b. 9 is a control unit, 10 a speed change point sensor for sensing a speed change point, 11 a vehicle mounted battery, 12 a key switch and 13 a d.c. motor having a shunt field or magnet field and driven by the battery 11 through the control unit 9. 14 is a worm shaft connected to an output shaft of the motor 13 and forming a reduction mechanism, 15 a worm wheel shaft meshed with the worm shaft 14 to drive the latter and 16 an electromagnetic clutch for engaging and disengaging the worm wheel shaft 15 with respect to the second pinion shaft 17 meshed with the second rack teeth portion 6b according to an instruction from the control unit 9.

Figure 2:
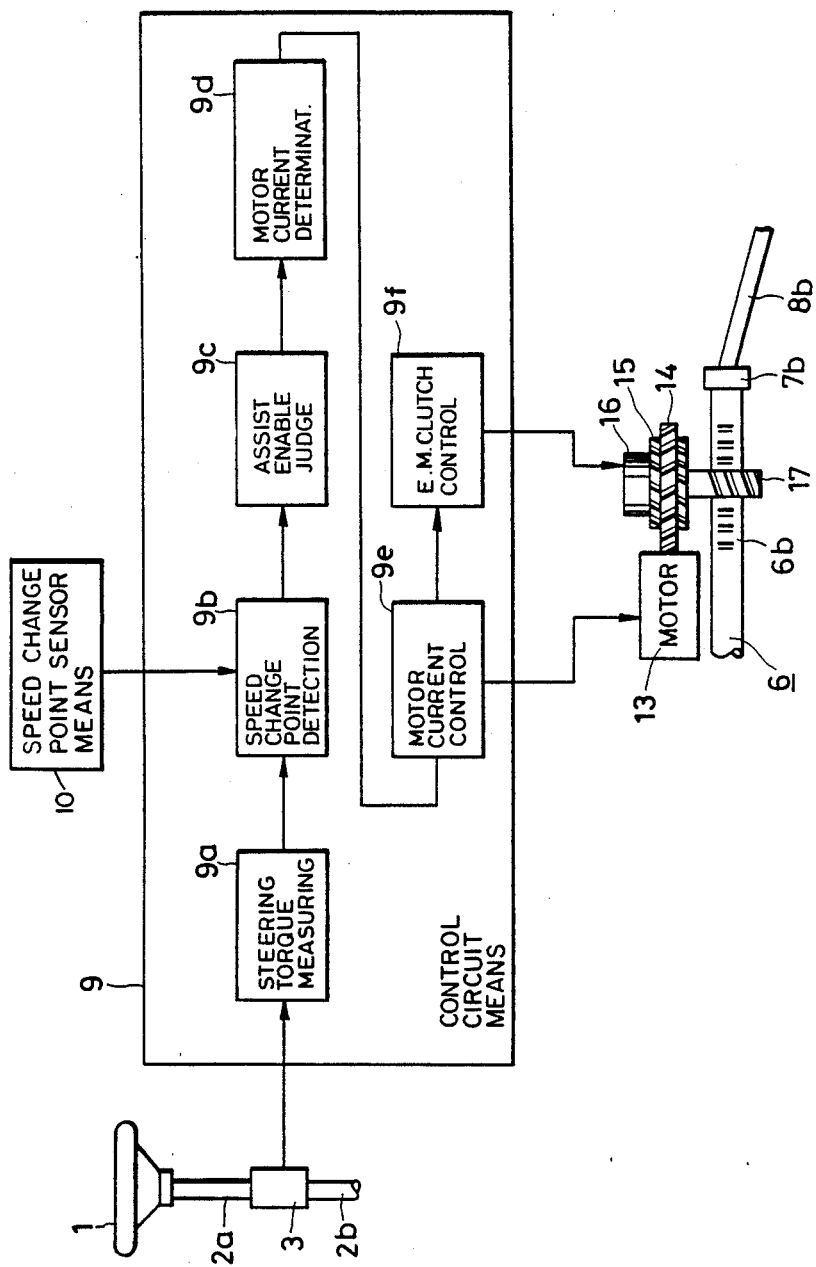
FIG. 2 is block circuit diagram of a control unit.

FIG. 2 shows a block circuit diagram of the control unit 9, in which 9a is a steering torque measuring means for measuring steering torque by means of an input from the torque sensor 3, 9b a speed change point sensing means for sensing speed change point according to an input thereto from the speed change point sensor 10, 9c a power-steering assist judge means responsive to an output of the speed change point sensor 9b for judging whether or not a power-steering assist is to be added to the vehicle's steering system, 9d a motor current setting means for normally setting a current to a value corresponding to a steering torque, setting the current to zero when an output of the power-steering assist judge means 9c indicates a negative decision, i.e., that a power-steering assist is not required to be added to a vehicle's steering system, setting predetermined delay times for shifts from an assist to an assist-cut-off and from an assist-cut-off to an assist, respectively, to increase the motor current to a value corresponding to a steering torque during the assist mode and to decrease the motor current to zero during the assist-cut-off mode, 9e a motor current control means responsive to an output of the motor current setting means 9d to control the motor current accordingly and 9f an electromagnetic clutch control means responsive to the outputs of the power-steering assist judge means 9c and the motor current setting means 9d to engage or disengage the electromagnetic clutch 16.

Figure 3:
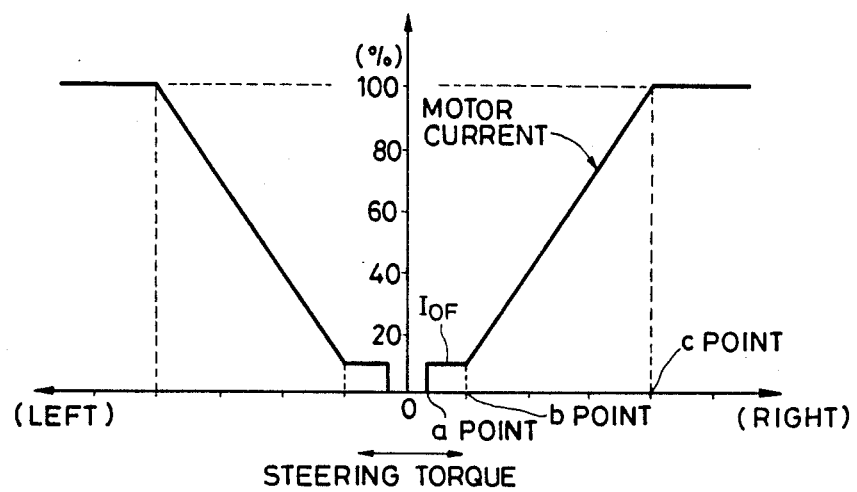
FIG. 3 is a steering torque vs. motor current curve showing a control characteristics.
Figure 4:
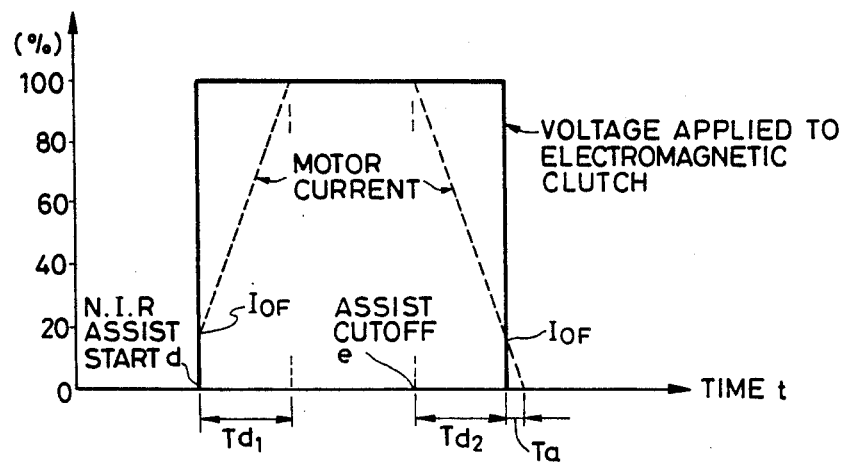
FIG. 4 is a motor current variation curve and a variation curve of voltage applied to an electromagnetic clutch showing a control characteristics when an assist condition is changed and FIG. 5 is a flow chart of a control program.
Figure 5:
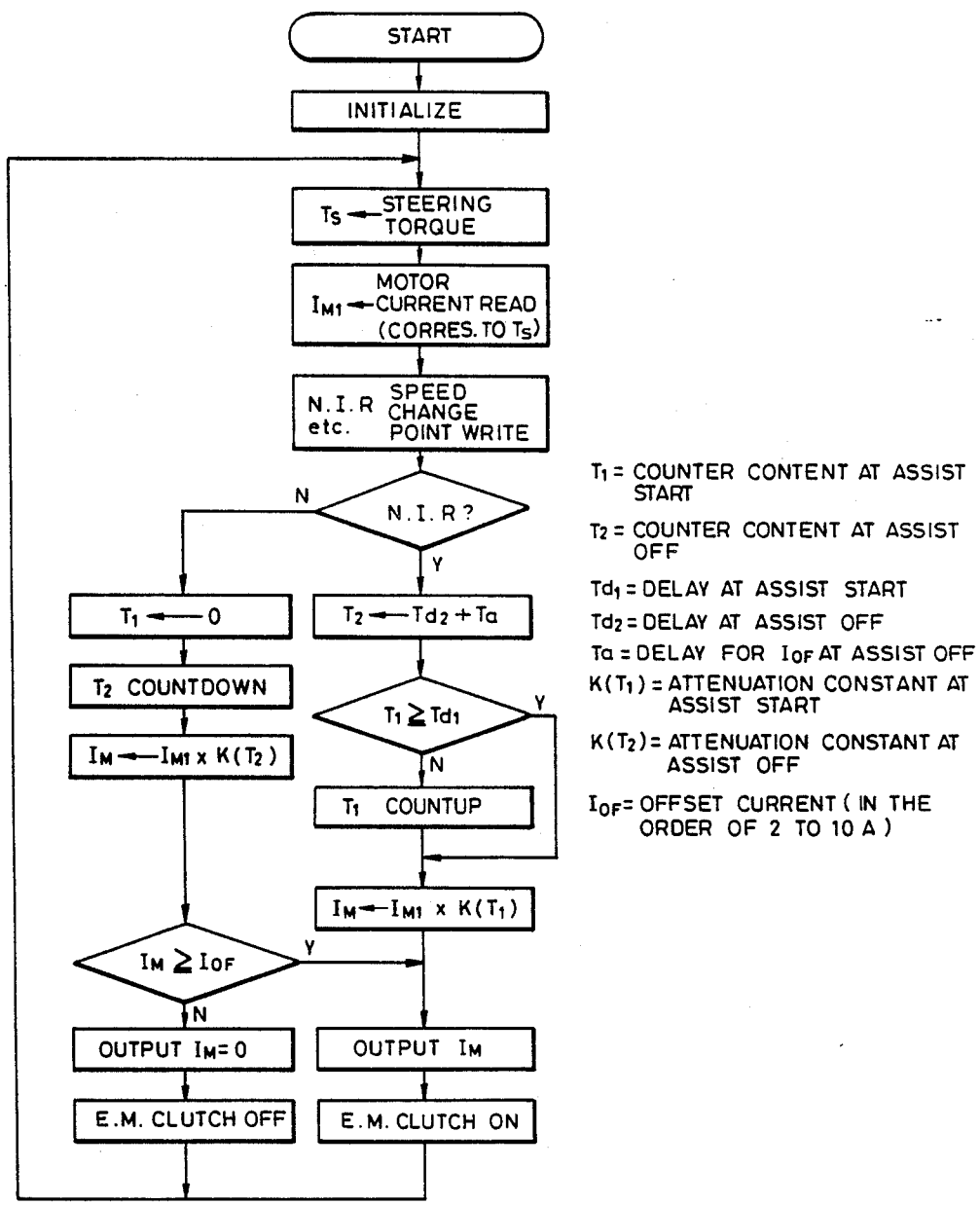

An operation of the present device will be described with reference to FIGS. 3 to 5. FIG. 3 is a steering torque vs. motor current curve showing a control characteristics of the present device, FIG. 4 shows a motor current and a voltage applied to the electromagnetic clutch vs. time curves when the assist judgement condition is changed due to change of speed change point and FIG. 5 is a flow chart showing a control program of the control unit 9.

When the key switch 12 is turned on to start an engine, the electromagnetic clutch 16 is energized, so that the worm wheel shaft 15 is engaged mechanically with the second pinion shaft 17. By applying a rotational force to the steering wheel 1 under this condition, the control unit 9 controls a current of the motor 13 as shown in FIG. 3. In FIG. 3, when the steering torque is increased in a rightward direction, the control unit 9 controls the motor 13 to be started at a point a and current I of which is in the order of 2 to 10 A to flow therethrough to reduce an effect of inertia of the motor and other mechanical system. With a further increase of the steering torque in the same direction, the control unit 9 controls the motor current at a point b to start to increase linearly with respect to the steering torque so that it becomes 100% current at a point c. When the steering torque is decreased, the motor current is controlled such that it decreases from the point c to $I_{OF}$ at the point b. When the steering torque is further decreased, the motor current is cut off to stop its operation at the point a. This control is the same for a steering torque variation in a leftward direction. A relation of transmission torque to motor current is linear. Therefore, when the torque increases in FIG. 3, the motor is turned on at the point a, a rotational force of the motor is transmitted through the worm wheel shaft 15, the electromagnetic clutch 16 and the second pinion shaft 17 to the second rack teeth portion 6b to assist an operation of the steering wheel 1. The above description is for the case where the output of the assist judge means 9c indicates affirmative.

The case where the output of the power-steering assist judge means 9c is changed from affirmative (i.e., requiring power-steering assist) to negative (i.e., not requiring power-steering assist) or negative to affirmative will be described below. It is assumed at this time that, in the flow chart in FIG. 5, an N (neutral), 1 (first speed) and R (reverse) are assist affirmative and other gear settings are assist negative. When the assist becomes affirmative at a point d in FIG. 4, the electromagnetic clutch 16 is engaged and simultaneously the motor current is increased steppingly from $I_{OF}$ to a value corresponding to the steering torque after a delay time $I_{dl}$ (e.g. 0.1 to 1.0 sec) to prevent the steering wheel 1 from becoming light abruptly. Then, when the assist becomes negative at a point e, the motor current is decreased gradually to prevent the steering wheel 1 from becoming heavy abruptly, and when it reaches $I_{OF}$, the motor current is made zero after a delay time $T_{d2}$ (e.g. 0.1 to 1.0 sec) and simultaneously the electromagnetic clutch 16 is deenergized to remove the assist to thereby make the steering assistless.

POSSIBILITY OF INDUSTRIAL UTILIZATION

As described hereinbefore, according to this invention, the use of the speed change point sensor for sensing a speed change point instead of the vehicle speed sensor for sensing a vehicle speed makes the input circuit and the control program simple and an inexpensive microcomputer usable. Further, since it is easy to judge a breakage of the input line of the speed change point signal by means of a logical product condition of speed changes other than those for which the assist is affirmative, the power steering control device is inexpensive and highly safe.

We claim:

1. A motor driven type power-steering control device comprising:
   speed change point sensor means for sensing a speed change point;
   torque sensor means provided on an intermedial portion of a steering shaft, for sensing a rotational force applied to a steering wheel;
   control unit means responsive to output signals of said speed change point sensor means and said torque sensor means;
   d.c. motor means driven by a vehicle mounted battery through said control unit means; and
   electromagnetic clutch means connected directly to an output shaft of said d.c. motor means, and on-off controlled by said control unit means.

2. The motor driven type power-steering control device as claimed in claim 1, wherein said control unit means comprises:
   steering torque measuring means, responsive to said output signal of said torque sensor means, for measuring a steering torque;
   speed change point detection means, responsive to said output signal of said speed change point sensor means, for detecting a speed change point;
   power-steering assist judge means, responsive to an output of said speed change point detection means, for judging whether or not a power-steering assist is to be added to a steering system;
   motor current setting means for performing the functions of: normally setting a current to a value corresponding to a steering torque, setting the current to a zero value when an output of said power-steering assist judge means indicates that a power-steering assist is not to be added to a steering system, setting predetermined delay times for shifts from said power-steering assist mode to an assist-cut-off mode and from said assist-cut-off mode to said assist mode, respectively, to increase the motor current to a value corresponding to a steering torque during said power-steering assist mode, and to decrease the motor current to a zero value during said assist-cut-off mode;
   motor current control means, responsive to an output of said motor current setting means, to control the motor current accordingly; and
   electromagnetic clutch control means, responsive to the outputs of said assist judge means and said motor current control means, to engage or disengage said electromagnetic clutch means.

* * * * *

UNITED STATES PATENT AND TRADEMARK OFFICE
CERTIFICATE OF CORRECTION

PATENT NO. : 4,939,436

DATED : July 3, 1990

INVENTOR(S) : Mitsuharu MORISHITA et al

It is certified that error appears in the above-identified patent and that said Letters Patent is hereby corrected as shown below:

On the title page, under item [86]:
Section 371 Date should read: -- March 11, 1988 --.

Section 102(e) Date should read: -- March 11, 1988 --.

Signed and Sealed this

Eighth Day of December, 1992

Attest:

DOUGLAS B. COMER

Attesting Officer

Acting Commissioner of Patents and Trademarks